United States Patent [19]

Fellows

[11] Patent Number: 5,564,998
[45] Date of Patent: Oct. 15, 1996

[54] CONTINUOUSLY-VARIABLE-RATIO-TRANSMISSION

[75] Inventor: Thomas G. Fellows, Oxford, England

[73] Assignee: Torotrak (Development) Limited, London, England

[21] Appl. No.: 436,237

[22] PCT Filed: Jan. 12, 1994

[86] PCT No.: PCT/GB94/00055

§ 371 Date: May 17, 1995

§ 102(e) Date: May 17, 1995

[87] PCT Pub. No.: WO94/16244

PCT Pub. Date: Jul. 21, 1994

[30] Foreign Application Priority Data

Jan. 18, 1993 [GB] United Kingdom ............... 9300862

[51] Int. Cl.⁶ ................................................. F16H 37/08
[52] U.S. Cl. ................................................. 475/216
[58] Field of Search ........................... 475/216, 218, 475/219

[56] References Cited

U.S. PATENT DOCUMENTS

| | | | |
|---|---|---|---|
| 3,091,132 | 5/1963 | Mayfield et al. | 475/219 |
| 4,768,398 | 9/1988 | Greenwood | 475/216 |
| 5,098,350 | 3/1992 | Sackschewsky | 475/218 |
| 5,232,414 | 8/1993 | Fellows et al. | 475/216 |
| 5,401,221 | 3/1995 | Fellows et al. | 475/216 |

Primary Examiner—Dirk Wright
Attorney, Agent, or Firm—Davis, Bujold & Streck, PA

[57] ABSTRACT

A continously-variable-ratio transmission ("CVT"), for instance of the toroidal-race rolling-traction type, capable of geared neutral and of operating in at least two regimes and including a ratio-varying component ("variator"), a power-recircuiting epicyclic, a final drive shaft connectable with the variator by way of one of two alternative driven shafts and an input epicyclic the input of which is connectable to a prime mover and the two outputs of which are connected to the two alternative driven shafts respectively. One of the regimes includes a "geared neutral" condition, and the power-recirculating epicyclic is associated with clutches whereby power is recirculated through it in that regime. In the remaining one or more regimes no power is recirculated within that epicylic, but drive reaches the CVT output by way of appropriate clutches and whichever of the two driven shafts will rise in speed as that regime proceeds.

6 Claims, 3 Drawing Sheets

CONTINUOUSLY-VARIABLE-RATIO-TRANSMISSIONS

This invention relates to continuously-variable-ratio transmissions ("CVT's"). The invention is broadly applicable to such CVT's in which the variator—that is to say, the ratio-varying component—is incapable of achieving zero ratio. That is to say, although the speed of rotation of the output member can be varied steplessly over a predetermined range, while the input member rotates at constant speed, the output speed range does not include zero. To enable the transmission to deliver zero output speed, it is customary to drive the CVT output from one component of an epicyclic gear unit, the other two components of which are connected, through gearing as necessary to match the epicyclic ratio to the output and input of the variator. When such a variator and an epicyclic are so combined it becomes possible, if the variator input speed is held steady and the variator is then traversed from one end of its ratio range to the other, to cause the CVT output speed to change continuously, first falling from a maximum speed in one direction to zero. In some cases it may then continue by rising to a maximum in the other direction. Throughout this process, and particularly at the moment (known in the art as "geared neutral") when the output speed is zero, the epicyclic will be recirculating power through the variator and other components of the CVT. Such an epicyclic is therefore known in the art as a "recirculating epicyclic". It is also well known for the CVT to include a second or "input" epicyclic, with one component connected to the prime mover.

It is also well-known in the art, and especially where the variator is of the toroidal-race rolling-traction type, to extend the ratio range of the CVT by introducing gearing and clutches whereby the variator is enabled to work in more than one "regime". That is to say, once the rollers of a variator of that type have swept from one end of their ratio angle range to the other, so progressing the CVT output speed from one value to another and perhaps with change of direction as just described, by operation of clutches so as to engage different gearing it is then possible to sweep the rollers back over their range of movement in the opposite direction and in so doing to progress the CVT output speed still further. By correct choice of gear ratios it is possible to change thus from one regime to another without instantaneous change of any speeds. Such a regime change is known in the art as a synchronous change.

An example of a CVT including the known features so far described, and also the provision of two separate driven members to which the final drive of the CVT may alternatively be connected, is to be found in Patent Specification GB-A-1454702. A CVT with the characterising features of the present invention differs in that it causes power to be recirculated within the recirculating epicyclic only in the regime including geared neutral, and in that in the other regimes the CVT output is simply connected to one of two shafts, these two shafts being located to opposite sides both of the variator and of the input epicyclic. This avoids the power losses that would be inevitable if power recirculation also took place in some or all of those other regimes and thus offers the prospect of substantial advantages, including reduced variator size, particularly in vehicles such as excavator trucks which are often required to deliver high torque when moving at low or zero road speed.

The invention is defined by the claims and includes the CVTs as shown in the accompanying, simplified and schematic drawings. The invention will now be described, by way of example, with reference to these drawings in which:

FIG. 1 is a system diagram;

FIG. 2 compares shaft speeds graphically;

Figure 1:
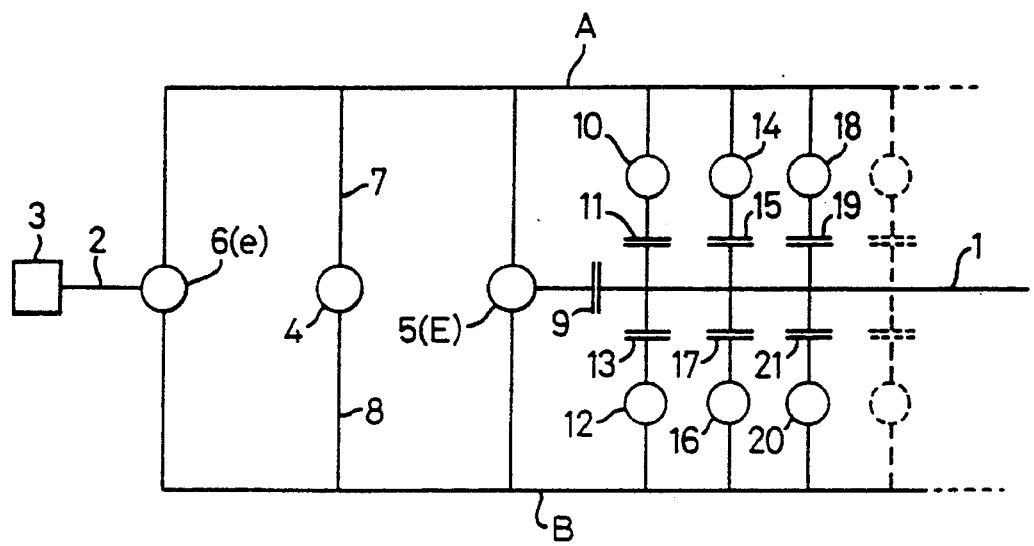

In FIG. 1 a CVT having an output shaft 1 and input shaft 2 (for connection to a prime mover at 3) comprises a toroidal-race variator 4, a recirculating epicyclic E (reference 5) and an input epicyclic e (reference 6). References 7, 8, indicate the shafts connected to the first and second operating members of variator 4. These members cannot as usual be referred to simply as the "input" and "output" members because, as will be seen, they exchange these functions as the CVT moves between regimes.

By way of shafts A and B the shafts 7, 8 are connected respectively to two of the components (for instance the sun and the planet carrier) of input epicyclic e, the third component of which (e.g. the ring gear) is connectable to the prime mover 3. The same shafts A and B are also connected, also by way of appropriate gearing, with two components (e.g. the sun and planet carrier again) of the recirculating epicyclic E and the third component (e.g. the ring) of unit E is connectable, in the regime including geared neutral, by way of low regime clutch 9 with the output shaft 1. In the diagrammatic form of FIG. 1, it will therefore be apparent that the speeds of rotation of shafts A and B, whose speeds of rotation are directly related to those of shafts 7 and 8, always move in antiphase as the rollers of variator 4 change orientation one way or the other, within their range of angular movement. Thus as they move from one end of that range to the other, one of shafts A, B will accelerate and the other slow down. As the rollers then traverse back again, as they will do in a successive "regime", the speeds of shafts A, B will change in the opposite sense.

In low regime clutch 9 will be closed, power will recirculate through epicyclic E, and as variator 4 progresses from one end of its ratio range to the other the speed of output shaft 1 can be arranged to make the typical, continuous "low regime" progression from a finite value in one direction, falling to zero and then climbing to a second finite value in the other direction. For all other regimes that may be required clutch 9 is disengaged, epicyclic E ceases to recirculate power and output 1 is driven by way of one of gearing/clutch combinations (10, 11; 12, 13; 14, 15; 16, 17; 18, 19; 20, 21 etc.,) from whichever of shafts A and B starts the respective regime at its lowest speed and rises to its highest during that regime. Thus, following the end of low regime at which output 1 is rotating forwards, and assuming shaft A is then rotating at its slowest speed, clutch 9 could be disengaged and clutch 11 engaged to put the CVT into a "middle" forward regime in which output 1 is driven by shaft A through gearing 10 until the relative speeds of shafts A, B have reached the opposite extreme value, when clutch 11 can be disengaged and clutch 13 engaged to enter a further, "high" forward regime in which shaft 1 is driven from shaft B through a different set of fixed gearing 12. If however the CVT reaches the end of low regime at which output shaft 1 is rotating in reverse, and it is wished to provide further "middle" and "high" reverse gears and to progress the CVT through those gears, then because shaft B will then be rotating at its slowest speed a typical sequence of clutch operation would be to disengage 9/engage 17 so as to drive the output by shaft B through fixed gearing 16 in "middle reverse", and then to disengage 17/engage 15 to drive the output from shaft A through further fixed gearing 14 in "high reverse". Items 18–21 indicate clutch/gearing combinations by which yet further regimes, forward and reverse, can simply be added. The ratios of variator 4, epicyclic E, and gearing sets, 10, 12, 14 etc., must of course be chosen, in a manner well known in the art, so that the clutch engagements/disengagements between regimes are achieved synchronously, as already described, without instantaneous change of the transmitted ratio.

Figure 2:
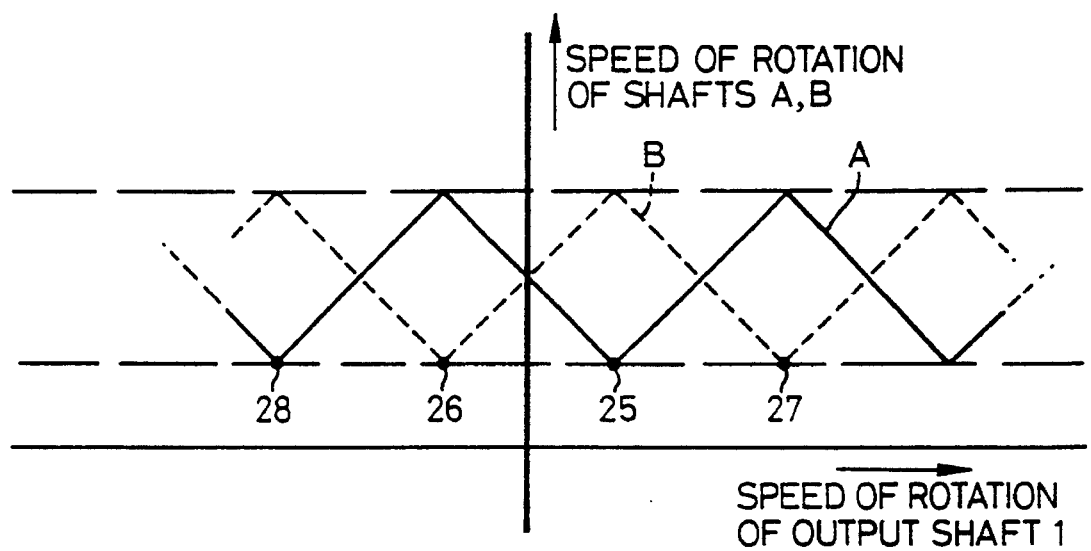

FIG. 2 is a simplified graphical representation of the typical relationship between the speed of rotation of output shaft 1 (x-axis) and the speed of shafts A and B (y-axis). Points 25–28 indicate the regime change points low-middle forward, low-middle reverse, middle-high forward and middle-high reverse respectively. It should be specially noted that the x-axis scale, as shown in this simplified Figure, is non-linear. Were it linear, the lines would typically be steep close to the y-axis, and would progressively flatten as they moved away from it in either direction.

Figure 3:
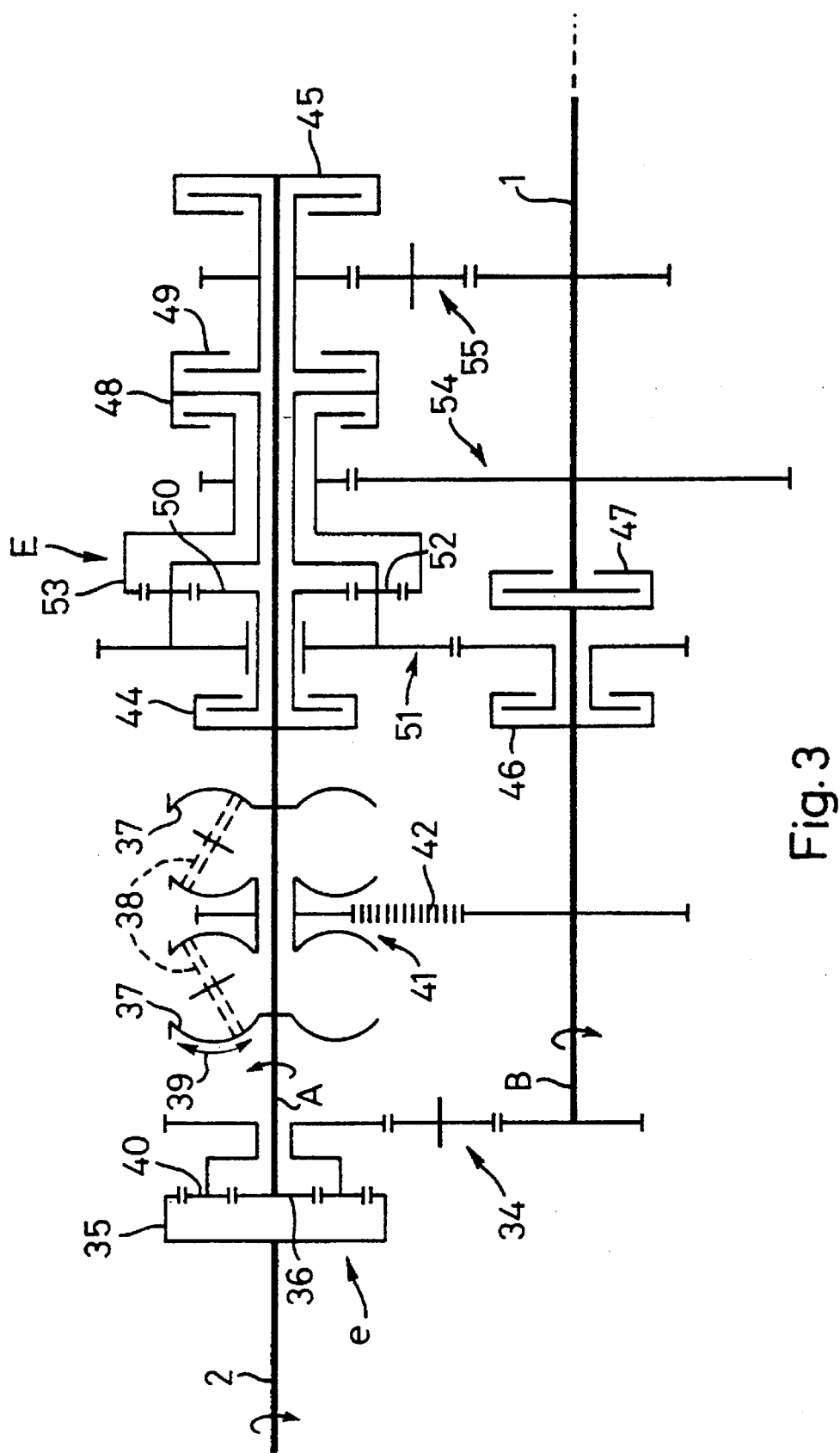
FIG. 3 shows one embodiment of a CVT.

In the practical embodiment of the invention shown in FIG. 3, parts directly comparable with those already introduced in FIG. 1 carry the same references. Input shaft 2 drives the ring gear 35 of input epicyclic e, and the sun 36 drives shaft A (=7) which carries the input discs 37 of the toroidal-race variator 4. Reference 38 indicates two of the variable-orientation rollers (typically six in all) of that variator, and 39 an arrow indicating the direction in which the rollers tilt during any one regime so as to change their "ratio angle" and thus the transmitted ratio. The planet carrier 40 of epicyclic e is connected by a gear train 34 to shaft B, which is also connected to the output discs 41 (=8) of variator 4 without change of direction by a chain 42. Shaft A also carries halves of clutches 44 and 45, and shaft B halves of clutches 46 and 47. The other half of clutch 47 is carried by the CVT output shaft 1. Two further clutches 48, 49 are provided.

To engage low regime, clutches 44, 46 are engaged and all the other clutches are open. By way of clutch 44, shaft A now drives the sun 50 of recirculative epicyclic E, and by way of clutch 46 and a reduction gearing train 51 shaft B drives the planet carrier 52. Power is recirculated within unit E and the output is delivered to shaft 1 by way of the ring gear 53 and a reduction gear train 54. When engaged together, clutches 44, 46 thus behave like clutch 9 of FIG. 1.

To change from low to middle forward regime, clutch 46 is opened and 48 closed, and clutch 44 remains closed. This has the effect of "locking" unit E so that it no longer recirculates power but instead rotates as one, and drive is transmitted to output shaft 1 from shaft A by way of the sun 50, the locked unit E and the same reduction gear train 54. Clutch 48 may thus be compared to clutch 11 of FIG. 1. To change from low to middle reverse regime, clutch 49 is closed and 44 opened, while clutch 46 remains closed. Drive is now transmitted to output shaft 1 from shaft B by way of clutch 46, reduction gearing 51, the planet carrier 52, clutch 49 and a reduction gear train 55 which also reverses motion relative to gear train 54. Clutch 49 may thus be compared with clutch 17 of FIG. 1, and in this regime the sun 50 and ring 53 of epicyclic E transmit no power. For the change between middle and high forward regimes, clutches 44, 48 are opened and clutch 47 is closed. Drive is now transmitted directly by the closed clutch 47 from shaft B to shaft 1. For the change between middle and high reverse regimes, clutches 46, 49 are opened and clutch 45 closed, and drive will then be transmitted directly from shaft A, by way of closed clutch 45 and gear train 55, to output shaft 1. Clutches 47, 45 thus equate with clutches 13, 15 in FIG. 1.

Figure 4:
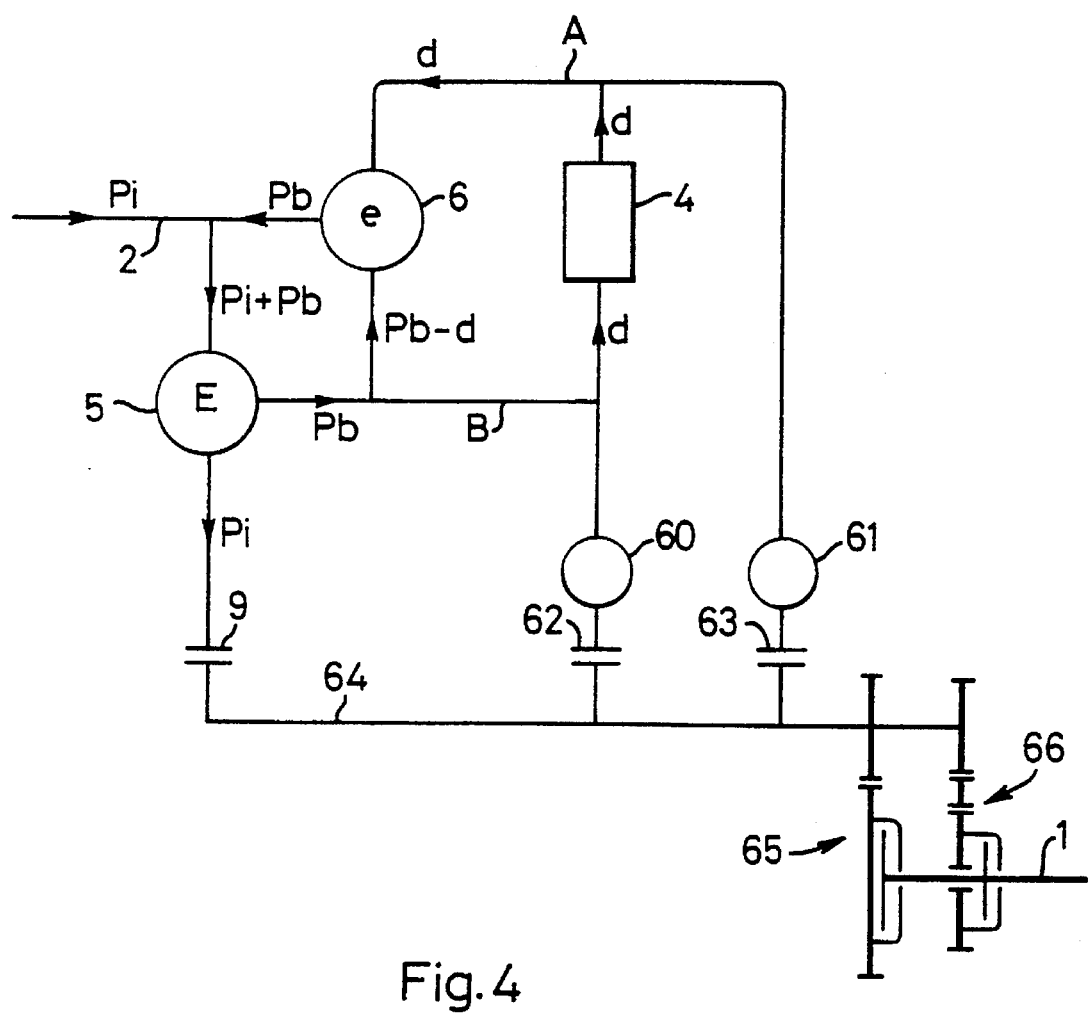
FIG. 4 shows one alternative to the system diagram of FIG. 1.

Assuming 100% efficiency, in the operation of any CVT the input power Pi, which equals the product of the speed Ni and torque Ti in input shaft 2, must equal the output power Po, which equals the product of output speed No and torque To in output shaft 1. In embodiments of the invention as described with reference to FIGS. 1 and 3 it can easily be arranged that the power transmitted through the variator 4 is considerably less than Pi in all regimes except low. In low regime, however, it may sometimes prove difficult to select gear ratios and other relative parameters so as to prevent the maximum variator power from rising inconveniently high. The maximum power which a toroidal-race variator must transmit Is a key factor in determining the size and cost of such a variator, so there are clear advantages In minimising that maximum power. FIG. 4 shows an alternative to the system diagram of FIG. 1, in which the relationship between input shaft 2, input epicyclic e, variator 4 and shafts A and B is as before, but recirculating epicyclic EIs displaced so that it now connects with shaft B, low regime clutch 9 and input shaft 2, instead of with clutch 9 and shafts A and B as before. Arrows Indicate the recirculation of input power Pi and the power Pb In shaft B within low regime, the symbol d indicating a power quantity which is greater than zero but less than Pb. In the embodiment of FIG. 4 further gearing 60, 61 and clutches 62, 63 are used to provide middle and higher regimes. The clutches 9, 62 and 63 all engage the drive with a layshaft 64 which will be driven In the same rotary sense in all regimes. If many regimes are required, using the layout of FIG. 1, the numbers of gears and clutches may be large. In a symmetrical "forward-and-reverse" system the number of gears and clutches can be halved, as in FIG. 4, by providing downstream forward and reverse gear assemblies 65 and 66. Having done so, low regime need only cater for output speeds from around zero (that is to say, geared neutral) to the low/middle regime synchronous change speed in one direction. This asymmetry enables the recirculating epicyclic E to be connected to the prime mover (via 2) and to only one side of the variator 4 (via shaft B), thus reducing the power transmitted through the variator. Another potentially advantageous aspect of the embodiment of FIG. 4 that should be noted is that the higher regime trains are used in both forward and reverse drive.

From the foregoing it will be seen that the invention may include a CVT in which the variator is not only combined with a recirculating epicyclic, but at least one of the two sides of the variator is also connected to a component of a second, input epicyclic, another component of which is connectable to the prime mover. Clutches and gearing are then also provided whereby power is recirculated through the recirculating epicyclic in the regime which includes geared neutral, but whereby in successive further regimes the recirculating epicyclic is by-passed and the drive reaches the CVT output, by way of appropriate clutches and gearing, from whichever side of the variator will rise in speed as that regime proceeds.

I claim:

1. A continuously-variable-ratio transmission ("CVT") capable of geared neutral and of operating in at least two regimes, and including a ratio-varying component ("variator") (4), a first epicyclic (E), a second epicyclic (e) the input (35) of which is connectable (via 2) to a prime mover (3), and a final drive shaft (1) connectable with one of two alternative driven rotary members (A, B) characterised in that the first epicyclic (E) is associated with appropriate clutches (44, 46) whereby power is recirculated through that epicyclic in one of the regimes which includes geared neutral, but whereby in the remaining one or more regimes no power is recirculated within it and the drive reaches the CVT output (1) by way of further appropriate clutches (48, 47, 49, 45) and of whichever of the two driven members (A, B) will rise in speed as that regime proceeds, and in that the two members (A, B) are respectively connected both to opposite sides of the variator (4) and to different output members (36, 40) of the second epicyclic (e).

2. A CVT according to claim 1, characterised in that there are at least three regimes, in at least one of which the final drive shaft (1) rotates in the forward direction throughout the regime.

3. A CVT according to claim 2, characterised in that in at least one other regime the final drive shaft rotates in the reverse direction throughout the regime.

4. A CVT according to claim 1 in which the variator is of the toroidal-race rolling-traction type.

5. A CVT according to claim 2 in which the variator is of the toroidal-race rolling-traction type.

6. A CVT according to claim 3 in which the variator is of the toroidal-race rolling-traction type.

* * * * *